Patented May 27, 1952

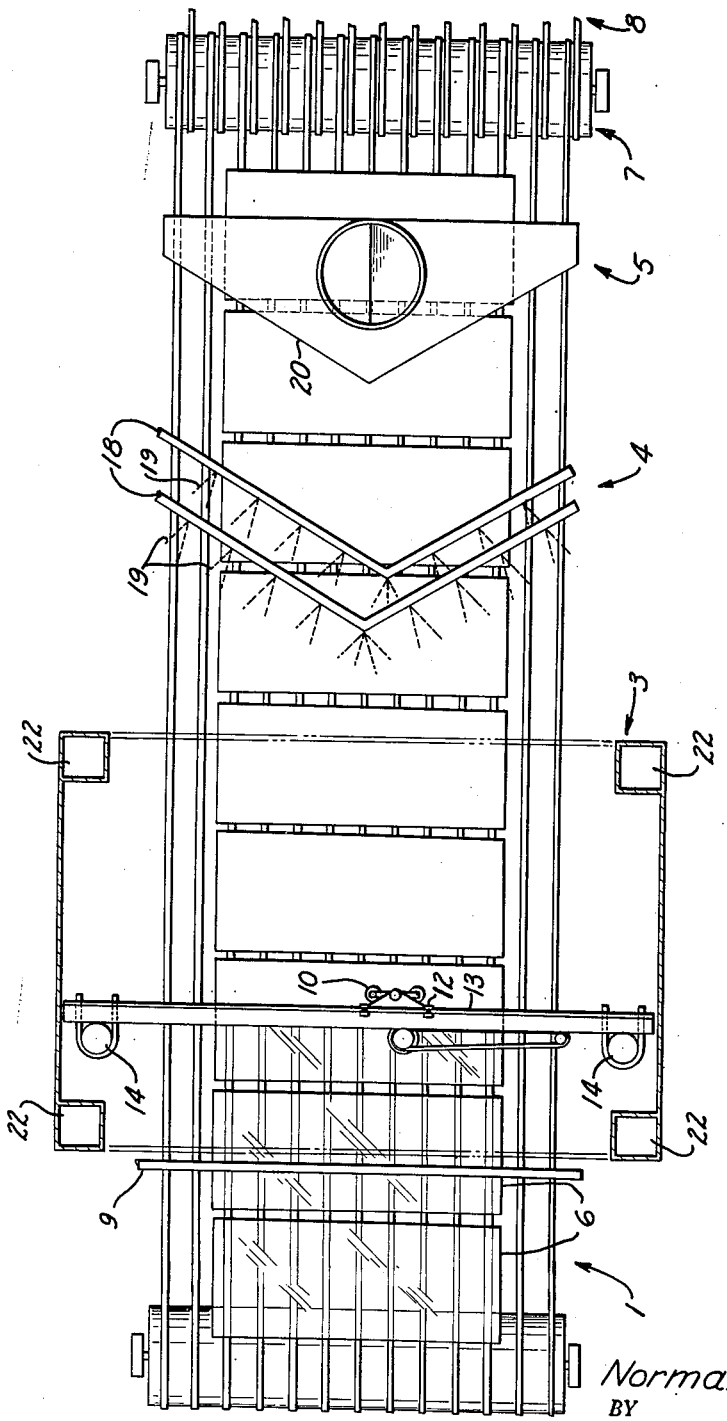

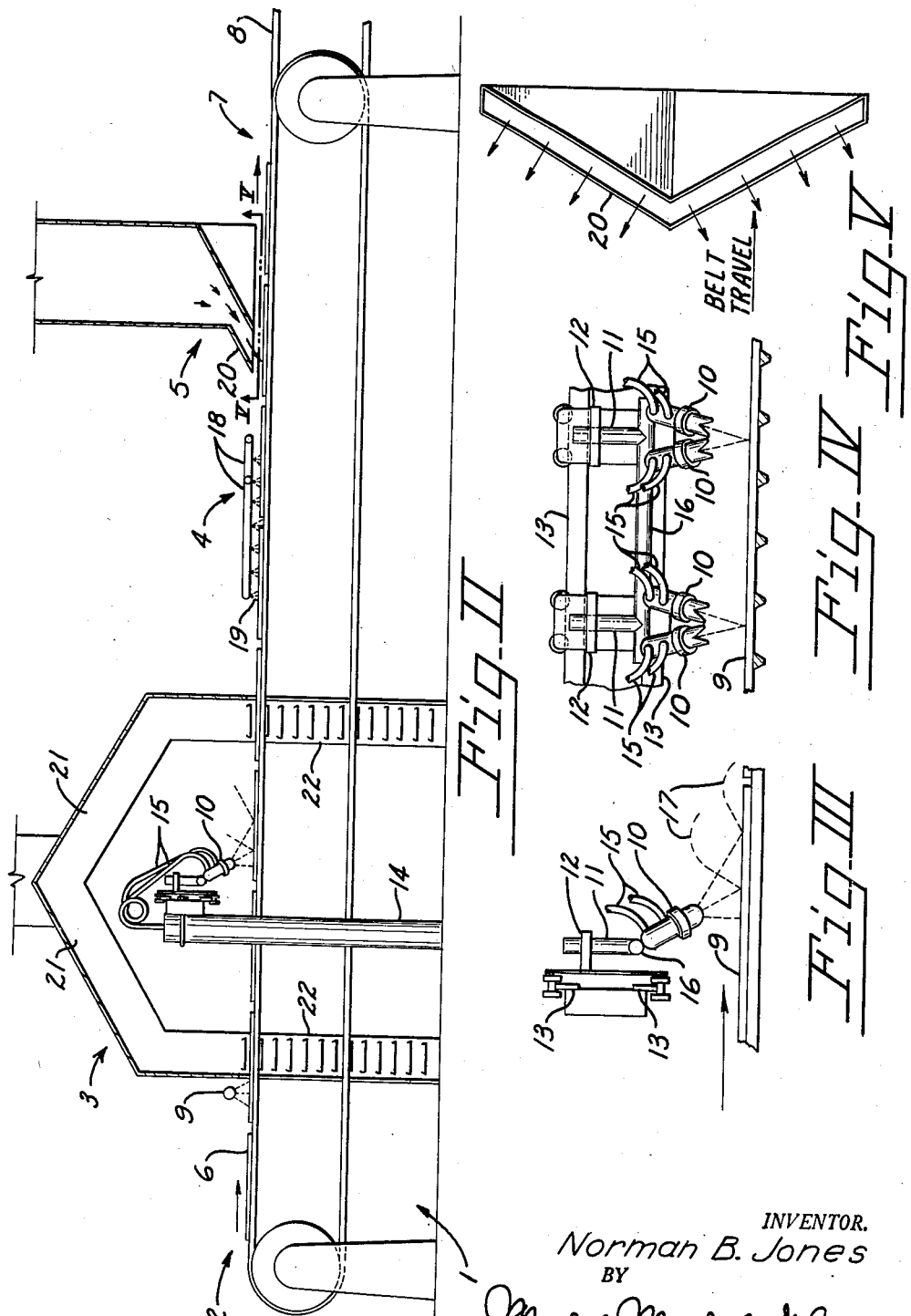

2,598,391

UNITED STATES PATENT OFFICE 2,598,391

SPRAYING PROCESS

Norman B. Jones, Toledo, Ohio, assignor to The Toledo Plate & Window Glass Company, Toledo, Ohio, a corporation of Ohio Application November 19, 1948, Serial No. 60,936

3 Claims. (Cl. 117—35)

1

This invention relates to the manufacture of mirrors and in particular to an automatic process and apparatus for silvering mirrors.

The ordinary method for the preparation of mirrors, particularly mirrors employing metallic silver as a reflecting surface, includes the steps of applying a solution containing a salt of the metal and a reducing solution to the surface and allowing the solutions to react to precipitate the metal as a coating on the surface. While other methods, such as vacuum distillation or cathodes sputtering, are available for the manufacture of mirrors the precipitation of metal from solution is the only method enjoying wide spread commercial usage.

The majority of mirrors manufactured commercially employ silver as the reflecting metal. In the silvering of these mirrors, solutions one containing a complex salt of silver such as silver ammonium nitrate and another solution containing a reducing agent which may be sugar, formaldehyde, glyoxal or a hydrazine salt, are mixed as they are applied to the surface of the glass so that the silver precipitated from the mixed solutions may adhere to the glass surface. The solutions have been applied by pouring processes in which a thin film of solution is allowed to drip or flow onto the surface to be silvered as the glass is carried along on a conveyor. In another process the solutions are sprayed from special spray guns so that the sprays intermix as they strike the surface to be silvered. The spraying process has normally been carried out by hand so that the operator may repeatedly go over the surface to be silvered until, by inspection, he is satisfied that each area has received an adequate amount of silver.

One difficulty that is experienced with any silvering method is that the reacting solutions, in addition to the desired silver deposit, produce a sludge or mud that must be removed at a later stage in the operation and that often leaves defects visible from the front of the mirror. These defects may be in the nature of pinholes—small areas where the sludge has prevented the deposition of a silver coating—or they may be in the nature of streaks where the sludge has run across the surface being silvered and has prevented a uniform deposition of silver. Another disadvantage is that a substantial amount of the silver as it is precipitated from the solution is caught in the sludge or mud and never reaches the surface to be silvered.

The deleterious effect of the sludge also shows up in other ways. For example, if the fringe of the spray is allowed to strike a clean surface to be silvered and is allowed to remain there an appreciable time before the main body of the spray covers that area the small particles from the fringe spray complete their reaction and in that reaction set up small islands of sludge which prevent the main body of the spray from depositing a uniform layer of silver on the glass or other article being silvered. This difficulty is avoided in the hand spraying processing since a fresh surface is not exposed in the spraying booth until the operator is ready to spray that particular piece and then he quickly applies a thin coating to the entire surface and then starts back over the surface to build up the film to the desired thickness. By operating in this manner the operator avoids the difficulties usually associated with the rebound or spatter of fringe from the spray guns.

The principal object of this invention is to provide a process and equipment for automatically spraying solutions upon a surface and controlling the action of such sprays to prevent contamination of the surface by spatter or fringe spray from the spraying equipment.

Another object of the invention is to provide spray equipment which, by its orientation with respect to the surface being sprayed, effectively prevents contamination of the surface prior to the application of the sprayed material.

A still further object of the invention is to provide a process for silvering of mirrors in which process the mirrors are carried on a conveyor extending through a silvering booth and in which silvering solutions are sprayed upon the mirrors in a direction such that the force of the spray tends to drive the residue of the solution onto previously sprayed areas at the same time that spatter from the spray is directed away from the cleaned surfaces to be silvered.

An ancillary object of the invention is to arrange the ventilating system for the spray booth so that the greater portion of the air exhausted from the booth is taken from points around the periphery of the booth in the region generally between a plane through the mirrors being sprayed and the floor of the booth.

More specific objects and advantages are apparent from the following description of the improved method and apparatus for spraying silvering solutions on glass surfaces in the production of mirrors.

According to the invention the articles to be coated, usually in the form of flat glass sheets to be silvered, are carried on a conveyor that extends through a spraying booth in which automatically operated spraying equipment applies the solutions that react to form the desired coating. The spray guns from which the solutions are sprayed are mounted on a carriage that is reciprocated along a path above and parallel to the surface of the conveyor and generally transverse thereof. In order that none of the spatter or mist from the spray shall collect on the clean surface ahead of the complete spraying of such surface the spray is directed in the direction of travel of the conveyor so that the spray strikes the surfaces of the article at an oblique angle tending to drive any residue of material onto previously sprayed areas as well as to carry any rebounding or spattering spray in the direction of conveyor travel and away from the clean unsprayed area. The dimensions of the spray pattern in the direction of travel of the conveyor is several times greater than the advance of the conveyor occurring during each traverse of the spray gun carriage whereby the film is built up through the successive application of several layers of material as each spray pattern overlaps the previously sprayed area.

After the sprayed solutions have had time to react and deposit the metal the conveyor carries the articles through a washing station in which jets of water are directed obliquely toward the oncoming conveyor in a direction tending to drive the residue of material towards the edges of the conveyor. Following the washing station the conveyor enters a drying station in which jets of air, traveling at high velocity, sweep all traces of wash water from the glass and leave it dried ready for the reception of a sprayed backing or protective coat.

The important feature in this process and equipment is the directing of the sprayed material in a direction such that the residue from the solutions is swept away from the area in which the metal is being precipitated onto the surface as well as away from any clean surfaces yet to be sprayed. Further, the elimination of any back spattering avoids the necessity of quickly covering the whole area of the article with a thin film of spray before successive layers are added. This improved process and equipment provides precise control of the solutions being applied to the glass or other article and thus permits the economical production of very high quality deposited films, such as silver films for mirrors in which the film or coating is extremely thin but very uniform in thickness and in which a minimum of materials is employed in producing the film.

Since it is commercially impractical to load the conveyor tightly enough to prevent any sprayed material from passing between the sheets of glass or other articles and since any such material driven therethrough may lodge on the under surface of the glass or article, the invention contemplates ventilating the spray booth by exhausting air at points around the periphery and at elevations included between the floor of the booth and the level of the upper surface of the conveyor carrying the articles to be sprayed. By extracting the air from the booth in this region the rebound materials from the surface of the glass are drawn towards the sides of the conveyor while the spray material passing between the pieces of glass or articles on the conveyor are drawn towards the sides of the booth rather than by allowing it to expand and through the effect of eddies strike the under surface of the articles.

Through the combined effect of these improvements it is possible to silver the piece of glass with a very uniform high reflection coating while using a minimum of materials and practically no labor outside of merely loading the glass onto the conveyor and removing the finished product therefrom.

Equipment embodying the invention and which may be operated to carry out the invention is illustrated in the accompanying drawings.

In the drawings:

Figure I is a plan view, schematic in nature, showing the general arrangement of the conveyor, spray booth, washing station, and drying station.

Figure II is a side elevation, partly in section, showing the general arrangement of the conveyor, spraying and washing equipment.

Figure III is an enlarged detail showing the general arrangement of the spray patterns with respect to the conveyor whereby undesired scattering of spray is avoided.

Figure IV is an end elevation, showing the relationship and orientation of the spray patterns from the spray guns.

Figure V is an enlarged horizontal section taken through the drying nozzle showing its relationship with respect to the direction of travel of the conveyor.

These specific figures and the accompanying description are intended merely to illustrate the invention but not to limit its scope.

The improved equipment for carrying out the invention includes a conveyor 1 that extends from a loading station 2 through a spray booth 3, a washing station 4, and a drying station 5. Glass sheets 6 to be silvered are loaded on the conveyor 1 at the loading station 2 and after passing through the spray booth, washing station, and drying station are transferred automatically from a discharge end 7 of the conveyor 1 to another conveyor 8 that carries the glass through a painting booth where a backing coating is applied over the silver to protect the silver against oxidation or other damage.

The conveyor 1 in an actual installation is approximately six feet in width and is composed of a plurality of V-belts spaced on six inch centers.

The conveyor 8 is similarly constructed and by using a common pulley between the conveyors is effectively made a continuation of the first conveyor. Thus, there is no difficulty whatsoever in transferring the glass sheets from the first to the second conveyor. The open construction of the conveyor afforded by the V-belts reduces the amount of the surface of a carried article that is contacted by the conveyor thus minimizing the possible contamination of the under surface of the glass because of foreign materials that may be on the conveyor belt.

In the preparation of glass for use as a mirror, particularly a mirror of good quality, the glass is polished and carefully cleaned to remove all traces of foreign material as well as minute scratches or other surface blemishes. After a final washing using distilled water the glass is washed with a weak solution of stannous chloride. While the action of the stannous chloride is not definitely known it is believed that it leaves very minute particles of tin adhering to the glass and that these small particles of tin serve as nuclei or seeds to promote the formation and adhesion of the silver film as the silver is precipitated from the solutions. In the operation of the improved equipment the glass, as soon as it has been washed with the dilute stannous chloride solution, is placed on the conveyor 1 at the loading station 2. For best results the glass surface is kept wet and for this purpose a water spray tube 9 is provided to replace whatever water may have evaporated or drained from the glass since washing with the stannous chloride solution.

Within the spray booth 3 a plurality of spray guns 10 (see also Figure II) are supported from the lower ends of rods 11 depending from a carriage 12 that is mounted on a track 13 extending above and parallel to the surface of the conveyor 1 and generally transverse thereto. The track 13 is supported at its ends from the uprights 14 erected on either side of the conveyor 1. Mechanism such as that shown in Patent No. 2,246,502 is used to drive the carriage 12 back and forth along the track 13. As shown in this patent the mechanism comprises a pair of sprockets one mounted at each end of the track 13, an electric motor to drive one of the sprockets, a chain trained over the sprockets and a pin extending laterally from one of the links of the chain, and engaging a slot or vertically slidable connection in the carriage 12 so that the carriage is driven along the track 13 by its engagement with the chain. In this manner the carriage moves at a uniform speed throughout the greater portion of its travel and at the ends of its travel smoothly reverses as the pin travels around the outer half-circle of the associated sprocket.

The solutions to be sprayed on the glass sheets 6 are conveyed through flexible hoses 15 connected to the spray guns 10 and to connecting blocks mounted on the track 13. Rigid piping may be used between the connector blocks and the tanks containing the solutions and the compressed air supply.

Referring to Figures III and IV the pattern from each of the spray guns 10 is preferably a thin fan such that when directed normal to a surface provides a long, narrow, elliptical pattern. The guns are mounted from a cross rod 16 supported at the lower ends of the rods 11 and are directed angularly toward the conveyor 1 in the direction of travel of the conveyor. For optimum results the angle is made such that most of the particles of the spray have a velocity in the same direction as the movement of the conveyor, that is, that one fringe of the pattern—one end of the long elliptical pattern—is located generally beneath the spray gun 10 while the ellipse points toward those portions of the conveyor that have already passed beneath the spray gun.

A plurality of spray guns 10 are employed at least one for each of the solutions being sprayed onto the glass. Thus a minimum of two spray guns is required one for the silver ammonium nitrate solution and the other for a reducing solution. If more than two guns are employed they may be used in pairs as illustrated in Figure IV or three of them may be arranged so that their patterns converge upon a single area of the glass.

By arranging the patterns from the spray guns so that they converge at or just above the surface of the glass very intimate thorough mixing of the two solutions is instantaneously secured as the solutions are applied to the glass. This thorough mixing of the solutions permits very rapidly acting reducing agents to be employed since the mixing of the solutions and their application to the surface takes place simultaneously.

The angle of the spray as shown in Figure III is very important in that it accomplishes in a very effective manner two functions each of which is necessary for commercially satisfactory operation of equipment. First, any particles of sprayed material that may rebound from the surface of the glass either move directly toward the spray guns 10 or, as shown by the dotted lines 17, move in the direction of movement of the conveyor so as to fall on those portions of the glass that have already received their full quota of silvering solution. This result is of peculiar advantage in that it reduces to a minimum the interval of time between the instant that the first particles of spray strike the glass and the time when that portion of the glass is completely covered with a film of solution. By reducing this time to a minimum the effect of sludge or residue from the solution interfering with the even deposition of silver is minimized if not completely eliminated.

The second advantage resulting from the angle at which the spray is directed against the glass on the conveyor 1 is that the force of the spray always tends to drive the residue from an immediately previous traverse of the spray toward the finished areas thus clearing away the residue to permit successive layers of solution to deposit their silver content directly on the glass or the previous film of silver. If this driving action is absent the residue remains on the sprayed surface and succeeding sprays must be given sufficient force to penetrate the residue or sludge in order that the silver may be precipitated at the surface to be silvered. Since only a fraction of the spray can be driven through such a sludge a failure to remove it is wasteful of material. Therefore, any arrangement that tends to drive the sludge away from the area being sprayed is much more economical of solution as well as being conducive to the production of superior silvered surfaces.

Solutions that are suitable for use in this equipment include silver ammonium nitrate as the silver bearing solution and glyoxal, hydrazine salts, or other organic compounds capable of precipitating silver from the silver solution as the reducing solution. These solutions, particularly those mentioned, have the advantage that impurities tend to rise in the sludge and that the residue or product remaining after the silver is precipitated may be driven by the force of the spray guns without leaving particles of impurities embedded in the silver film.

If desired cams may be arranged on the track 13 to cooperate with a cam follower or followers on the carriage 12 to trigger the spray guns near the ends of its travel so that material is sprayed only on that portion of the conveyor that is actually covered with glass. This triggering of the guns besides saving the solution that would otherwise be wasted at the sides of the conveyor also keeps the guns in good operating order since the intermittent operation tends to dislodge any particles that may tend to clog the nozzles or to adhere to the sides of the passages through the guns or in the hose. The point of triggering of a gun may be made adjustable so that an operator by watching the conveyor may continuously adjust the width of the operating area to conform to the glass being processed.

After being sprayed the glass with its coating of silver and sludge passes beneath a pair of generally V-shaped washing nozzles 18 that direct jets of wash water 19 diagonally toward the sides of the oncoming conveyor so that the jets 19 sweep the sludge across the surface of the glass toward the edges thereof where it may drain to a collecting system installed beneath the washing station 4. This wash water while driven with sufficient force to move the residue of the material does not have sufficient velocity to disturb the coating of silver deposited on the glass itself. In the arrangement of the tubes or pipes 18 the point of one V may be staggered transversely of the conveyor with respect to the other so that every portion of the conveyor surface as it passes through the washing station 4 is subjected to a thorough washing action.

After passing the washing station 4 the conveyor carries the glass 6 through a drying station 5 in which a nozzle 20, generally V-shaped in plan, directs sheets of air at relatively high velocity diagonally toward and across the oncoming conveyor. These streams or sheets of air moving obliquely across the conveyor drive the water from the silvered surface of the glass and from the edges thereof so that after the glass has passed the drying station 5 it is in condition to be painted with a copper bearing paint or other protective coating which serves to seal the silver and protect it against oxidation or other damage. After the paint or other coating has thoroughly dried the mirror is ready for mounting if it is to be used in ordinary locations. Mirrors that are used where corrosive atmospheres are present during some or all of the time may require a second or third coat of paint in order to adequately protect and seal the silver.

One source of difficulty that is often encountered when a spraying process is employed is that some of the sprayed material passing the edges of the sheets of glass finds it way back to the under surface of the glass where it leaves spots that must be subsequently removed. Since additional labor is required to remove these spots it is desirable if possible to prevent any of the material that passes the edges of the glass from reversing its direction of travel and lodging on the glass. To this end the spraying station or spray booth 3 is provided with ventilating ducts 21 through which air is exhausted from the interior of the booth. This air is drawn through vertical risers 22 located at points around the periphery of the booth and which draw air from the region between the floor of the booth and the region near and slightly above the plane of the conveyor passing therethrough. By withdrawing air from this lower portion of the spray booth at a rate substantially greater than the supply of air through the spray guns it is possible to prevent any reverse flow of air from the spray guns such as usually accompanies the expansion of the air as it issues from the nozzles of the guns and thus prevents any of the sprayed material from collecting on the under surface of the glass as it is carried along on the conveyor.

Portions of the conveyor belts are, of course, exposed to the spray when the glass is not loaded edge to edge. This offers no difficulty because the solutions deposited on such exposed areas of the conveyor belts have time to completely react with each other before the conveyor belt completes its journey along the conveyor length and is loaded with a fresh piece of glass. The completely reacted solutions are easily washed away and have no ingredients tending to adhere to the glass to cause trouble later.

The same ventilating arrangement may be employed in subsequent painting stations to prevent paint or other coating material from being deposited on the front face of the mirror.

The improved process and equipment for carrying out the process permit the production of high quality mirrors with a minimum of materials and very little labor. The only labor required in carrying out the process is that of washing the glass preparatory to silvering, loading the glass onto the conveyor, maintaining the proper quantities of solutions for supply to the spray guns, controlling the width on the conveyor covered by the spray from the spray guns, similarly supervising the operation of the paint spray guns and finally unloading the conveyor as the processing operation is completed.

Various modifications may be made in the specific details of construction for preventing the contamination of fresh surfaces approaching the spraying stations and for disposing of over spray or spatter without departing from the spirit or scope of the invention.

Application Serial No. 102,976, filed July 6, 1949, now Patent No. 2,581,957, is a division of this application and claims subject matter disclosed herein.

Having described the invention, I claim:

1. A process for producing a silver film on a solid surface comprising the steps of directing toward said surface, to intermingle at said surface, separate sprays of a silver containing solution and a reducing solution adapted to precipitate silver from the silver containing solution, traversing the sprays back and forth along a path parallel to said surface, continuously moving said surface relative to the sprays in a direction parallel to said surface and generally transverse to the back and forth motion of the sprays, so that the spray patterns of successive traverses overlap, the sprays being directed obliquely toward said surface in the direction of the continuous movement of said surface relative to the sprays, whereby the residue of spent spray solutions is driven onto previously sprayed portions of said surface by the force of the obliquely directed sprays.

2. A process according to claim 1 wherein the sprays are so directed that the spray pattern of one spray on the solid surface constantly coincides with the spray pattern of the other spray on said surface.

3. A process according to claim 1 wherein the sprays are so directed that substantially all of the spray pattern of each spray on the solid surface is restricted to an area of said surface that has passed a plane normal to said surface passing through the apex of the spray.

NORMAN B. JONES.

REFERENCES CITED

The following references are of record in the file of this patent:

UNITED STATES PATENTS

| Number | Name | Date |
|---|---|---|
| 1,804,484 | Wetmore | May 12, 1931 |
| 1,956,220 | Johnston et al. | Apr. 24, 1934 |
| 2,214,476 | Peacock | Sept. 10, 1940 |
| 2,355,186 | Tischer | Aug. 8, 1944 |
| 2,363,354 | Peacock | Nov. 21, 1944 |
| 2,423,051 | Smith | June 24, 1947 |